M. C. HOPKINS & L. W. ROSENTHAL.
ADDING MECHANISM.
APPLICATION FILED FEB. 27, 1912.

1,281,163.

Patented Oct. 8, 1918.
4 SHEETS—SHEET 1.

Witnesses:
Inventors
M. C. Hopkins & L. W. Rosenthal
By their Attorneys
Pennie, Davis & Goldsborough

M. C. HOPKINS & L. W. ROSENTHAL.
ADDING MECHANISM.
APPLICATION FILED FEB. 27, 1912.

1,281,163.

Patented Oct. 8, 1918.
4 SHEETS—SHEET 2.

Witnesses
Inventors
M. C. Hopkins & L. W. Rosenthal
By Attorneys
Pennie, Davis & Goldsborough M. C. HOPKINS & L. W. ROSENTHAL.
ADDING MECHANISM.
APPLICATION FILED FEB. 27, 1912.

1,281,163.

Patented Oct. 8, 1918.
4 SHEETS—SHEET 3.

Witnesses
Inventors
M. C. Hopkins & L. W. Rosenthal
By Attorneys

M. C. HOPKINS & L. W. ROSENTHAL.
ADDING MECHANISM.
APPLICATION FILED FEB. 27, 1912.

1,281,163.

Patented Oct. 8, 1918.
4 SHEETS—SHEET 4.

Witnesses:

Inventors
M. C. Hopkins & L. W. Rosenthal
By their Attorneys
Pennie, Davis & Goldsborough

UNITED STATES PATENT OFFICE.

MARCUS C. HOPKINS, OF JERSEY CITY, NEW JERSEY, AND LEON WALTER ROSENTHAL, OF NEW YORK, N. Y.; SAID HOPKINS ASSIGNOR TO SAID ROSENTHAL.

ADDING MECHANISM.

1,281,163.  Specification of Letters Patent.  Patented Oct. 8, 1918.

Application filed February 27, 1912. Serial No. 680,246.

*To all whom it may concern:*

Be it known that we, MARCUS C. HOPKINS and LEON W. ROSENTHAL, citizens of the United States, and residing, respectively, at No. 235 Jewett avenue, Jersey City, Hudson county, New Jersey, and No. 240 West 137th street, New York city, New York county, New York State, have invented certain new and useful Improvements in Adding Mechanisms; and we do hereby declare the following to be a full, clear, and exact description of the invention, such as will enable others skilled in the art to which it appertains to make and use the same.

The present invention relates to adding mechanism of simple and effective organization, and particularly to one well adapted to calculating machines such as adding, subtracting, multiplying and dividing machines, or the like.

One object is to provide an adding mechanism wherein all the elements thereof are positively connected together at all times during operation.

Another object is to provide an adding mechanism whose separate denominations may be operated upon individually or simultaneously, and in any order or combination.

Another object is to provide an adding mechanism wherein the transfer operations to carry units to the next higher denominations may be performed simultaneously with the adding operations on those denominations.

Another object is to provide a mechanism whose elements may be operated in both directions, whereby addition may be performed in one direction of operation, and subtraction in the other direction of operation, and whereby the net result of addition and subtraction may be readily obtained, without interposing reversing gears or the like for the purpose.

Another object is to provide an adding mechanism which may be combined with one or more accumulating mechanisms, wherein the adding movements are simultaneously communicated to all mechanisms, and wherein the transfer operations of each mechanism is independent of all the other mechanisms.

Another object is to provide means for separately clearing the indicators of each mechanism whereby the indicators of the accumulating mechanism may be retained in the position to which they were actuated when the indicators of the adding mechanism are cleared, and vice versa, so that sub-totals and grand totals, for instance, may be ascertained in the same operation.

Another object is to provide disengageable locking mechanism for the individual denominations, whereby the transfer movements are properly effected at all times while the adding and clearing operations are not interfered with.

Another object is to provide a rectifier for positioning the indicators after each operation, whereby the back lash and other lost motion in the mechanism is eliminated before the result is read off.

Other desirable objects in construction and operation will be apparent from the following description, and will be specifically pointed out in the appended claims.

In most of the adding mechanisms heretofore customary, the elements are not positively connected together, and they usually require the interposition of reversing devices to adapt them to all the arithmetical operations. Furthermore, the adding and transfer movements are usually successive so that the transfer mechanisms have a delayed action requiring periods of operation distinct from the periods of the adding operation. And the adding mechanisms do not readily permit of association with accumulating mechanism without disengageable or equivalent devices to segregate the transfer operations of the two mechanisms.

In accordance with this invention, these difficulties are removed by employing a differential gearing for each denomination of the adding mechanism and a differential gearing for each denomination of the accumulating mechanism, if such is used, and so connecting the different gearings of the two mechanisms that the adding movements are simultaneously communicated to both, while the transfer movements of each mechanism are rendered independent and are superposed on their respective adding movements. Each differential gearing preferably consists of three positively connected components comprising a driving component operatively connected to an actuating member of the calculating machine, a transfer receiving component operatively connected to the next lower denomination, and an indicating or transfer actuating component adapted to be driven by either of the other two components separately, or simultaneously by both of them. The indicating component has a fixed velocity ratio with the driving component and with the transfer receiving component, so that the superposition of the adding and transfer movements increases the velocity of the indicating component and thereby advances it an amount proportional to the sum of the two movements during the period of simultaneous operation. The driving components of the differential gearings may be actuated by any suitable actuating devices, as gears, keys, racks, segments or disks, in any suitable form of calculating machines as key-set or key-actuated adding or multiplying machines.

The transfer operation to carry units is preferably effected by means of positively connected intermittent gearing for each denomination of each mechanism connecting the transfer actuating or indicating component of one differential gearing with the transfer receiving component of the next higher denomination, the driving component of those denominations which are not otherwise engaged being held against movement by locks to insure the transfer in each case. The clearing devices for the adding and accumulating mechanisms are preferably independent, and may comprise means for disconnecting the three components of each differential gearing during the operation of resetting the indicators to zero, or for disconnecting the actuating members of the machine from the adding and accumulating mechanisms before resetting the indicators.

We have found that in constructing adding mechanisms of this kind comprising a plurality of denominations the transfer movements may be gradually lost in a long succession of carrying operations as a result of the back lash and lost motion in the mechanism. To overcome this difficulty, we have provided a rectifier which positions the indicators in succession from the lowest to the highest denominations at certain intervals of operation, thereby completing all partial transfers which may have occurred and also holding the indicators in proper position for reading. The rectifier disclosed herein for the purpose also assists in the clearing operation by preventing overthrow of the indicators past their zero readings.

In the accompanying drawings illustrating several modifications within our invention.

Figure 1:
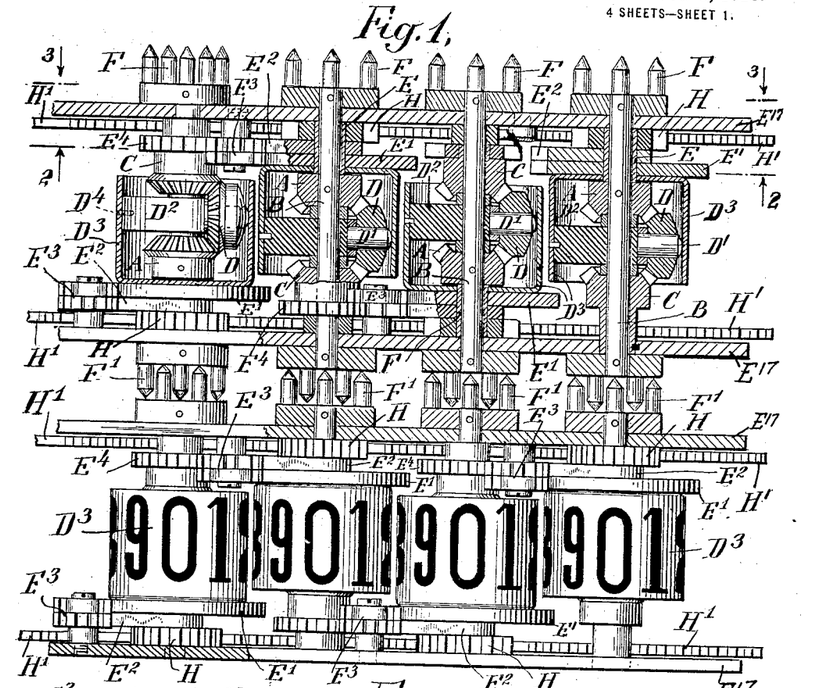
Figure 1 is a plan view, partly in section, of one form of adding mechanism associated with an accumulating mechanism.
Figure 2:
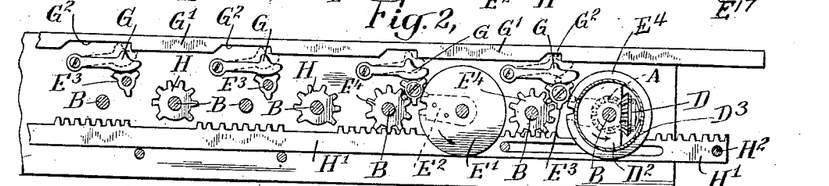
Fig. 2 is a sectional elevation approximately on line 2—2 of Fig. 1.
Figure 3:
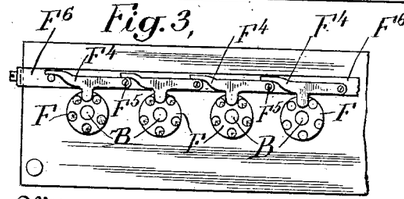
Fig. 3 is a reduced sectional elevation approximately on line 3—3 of Fig. 1.
Figure 4:
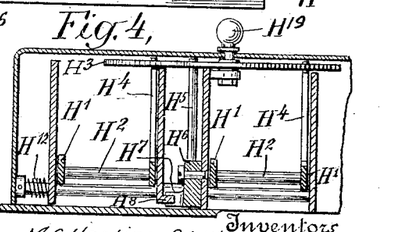
Fig. 4 is a reduced sectional end elevation of associated adding and accumulating mechanisms, with the gearings and indicators omitted, particularly showing the clearing means.
Figure 16:
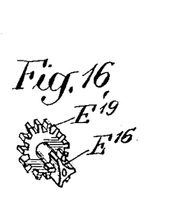

The construction of the associated adding and accumulating mechanisms shown in Figs. 1 to 6 will now be described with particular reference to such forms of calculating machines as multiplying machines having traveling carriages, although it is to be understood that this specific adaptation is not essential to the invention. Four successive denominations are shown in the adding mechanism and four in the accumulating mechanism, but any other suitable number of denominations and of associated mechanisms may be similarly constructed. It is immaterial which constitutes the adding mechanism and which the accumulating mechanism; however, in this case the upper one in Fig. 1 is referred to herein as the adding mechanism and the lower one as the accumulating mechanism. The differential gearing of each denomination in both is similar to all others, except the ones of highest and lowest denomination. Each differential gearing comprises a driving component, the bevel gear A, fastened tightly on the driving or actuating shaft B; the transfer receiving component, the bevel gear C, loosely mounted on the shaft B, but fastened rigidly to the fixed frame $E^{17}$ of the machine in the case of only the lowest denomination of each mechanism; and the transfer actuating or indicating component comprising the bevel gear D and the carrier $D^2$, which is loosely mounted for free rotation on the shaft B. The gear D is loosely mounted on the stud $D^1$ projecting from the carrier $D^2$, and the carrier is fastened to the dial $D^3$ by a pin $D^4$. The dials surround the three components of the differential gearings and the shafts B, and hold the three corresponding bevel gears permanently in mesh. The digits 0 to 9 are arranged consecutively in the same direction around each of the dials of each mechanism, and the usual sight holes J are provided. On the sleeve E carrying the dial $D^3$ is also fastened a cut-out disk $E^1$ secured to a two-tooth segment $E^2$. The periphery of the cut-out disk runs in the cut-out part of a six-tooth intermediate transfer gear $E^3$, (see $E^{16}$ of Fig. 16) while the segment $E^2$ periodically engages with the six-teeth thereof so as to turn the gear two teeth or one-third of a rotation when the corresponding dial is passing from 9 to 0 in addition, or from 0 to 9 in subtraction. The six-tooth part of this cut-out gear $E^3$ engages with the ten-tooth transfer gear $E^4$, which is fastened to the indicating or transfer receiving component C of the differential gearing. Obviously, if desired, the cut-out disk $E^1$ and the segment $E^2$ may be omitted from the highest denomination, while the ten-tooth transfer gear $E^4$ may be omitted from the lowest denomination of both the adding and the accumulating mechanisms. The adjacent differential gearings are reversely arranged so as to bring the ten-tooth transfer gear $E^4$ of one denomination in line or register with the toothed segment $E^2$ of next lower denomination.

The operation of the adding and accumulating mechanisms shown in Figs. 1 to 6 is as follows: The five-point clutch members F are fastened on the shafts B and are adapted to be actuated by any suitable operating mechanism of adding, multiplying, or other suitable calculating machines, while the adding and accumulating mechanisms are connected together by the disengageable five-point clutch members $F^1$. By turning any of the clutches F, the corresponding shafts B and driving components A of both the adding and accumulating mechanisms are turned through the same amount. The transfer receiving components C of those differential gearings are locked in position as a result of the engagement of the intermediate transfer gears $E^3$ with the respective transfer gears $E^4$ and with the cut-out disks $E^1$, while the transfer receiving components of lowest denomination are fixed to the frame $E^{17}$ of the mechanism, as shown. Hence, when the shafts B are turned the bevel gears D of those differential gearings are rolled on their respective transfer receiving components C and turn the respective dials $D^3$ through one-half the amount of rotation of the shafts B. Thus by turning a shaft B through two rotations, the corresponding dials of the adding and accumulating mechanisms are each turned through one rotation, or 10 digits. Now, when any dial is passing from 9 to 0 in one direction, or from 0 to 9 in the other direction, as the case may be, the toothed-segment $E^2$ fastened on sleeve E with its dial $D^3$ advances the ten-tooth transfer gear $E^4$ of the next higher denomination through two teeth in the same direction of rotation, through the intermediate transfer gear $E^3$. The transfer receiving component C of that next higher denomination is turned through one-fifth of a rotation in that same direction. The indicating component is turned thereby through one-tenth of a rotation in the same direction as by its driving component A, and through the amount produced by one-fifth of a rotation of the shaft. Therefore during each transfer movement, the dial $D^3$ of that denomination is turned through one-tenth of a rotation, or through one digit, in the direction of actuation of the shaft B. In this way, units are transferred to any denomination when the shaft B of that denomination is not being actuated. When the shaft B of one denomination is being rotated one-fifth of a rotation at the same time that a transfer movement is being imposed upon that denomination, the bevel gears A and C move in the same direction and carry the indicating component one-fifth of a rotation or two digits on the indicator, thereby indicating the sum of the adding and transfer movements. During this operation the bevel gear D is not rotated upon its stud $D^1$. It is apparent that the shafts B may be locked in position so that they are not turned as a result of the transfer operation, and hence the transfer operations of two or more mechanisms on the shafts B may be kept entirely independent of each other. In performing addition the transfer operation occurs when one unit is being added to any denomination whose dial was previously at 9 and will occur simultaneously across the entire adding or accumulating mechanism whose dials are at 9 before the 1 is added to the lowest denomination. Similarly in subtraction, the unit will be subtracted simultaneously across the mechanism whose dials are at 0 before the 1 is subtracted from the lowest denomination.

If the clutch members F are positively connected to actuating mechanism at all times, then the shafts B are always locked against turning when a unit is being transferred. However, if only some of the clutch members are connected at a time to actuating mechanism, as may be the case in a multiplying machine having a traveling carriage which engages groups of the shafts at a time, those shafts of higher denomination than the highest denomination engaged at any one time should be positively locked to prevent them from being turned by the indicating component to which a unit is being transferred. This may be done in any suitable way but a simple construction for the mechanism of Figs. 1 to 6 is shown particularly in Figs. 3 and 5. There is a pin $F^2$ on the traveling carriage $F^3$ adjacent each clutch member F thereof, and each is so arranged that when these clutch members are coming into locking engagement with the coacting clutch members on the shafts B, the pins $F^2$ lift the respective locking dogs $F^4$ out of engagement with the respective clutch members F, so that those shafts B to be actuated by the clutch members of the traveling carriage $F^3$ are free to rotate while all other shafts are then securely locked. When the traveling carriage recedes to disengage the clutch members F, the locking dogs $F^4$ previously lifted by the pins $F^2$ now fall back in place. In this way all those shafts B not being actuated are positively locked against rotation so as to effect the proper transfer of units to denominations higher than those engaged by the traveling carriage at the time, while the engaged shafts are unlocked to permit actuation by the actuating mechanism. The locking dogs $F^4$ are pivoted at $F^5$ to a bar $F^6$ and overlap each other in such manner that they may be individually lifted by the pins $F^2$ and may be collectively lifted out of locking engagement with the clutch members F by raising the bar $F^6$ during the operation of clearing the dials, as will be noted later.

Any suitable means for clearing or resetting the dials to zero may be used, but mutilated gears and racks are well adapted for the adding and accumulating mechanisms shown in Figs. 1 to 6. The sleeve E of each denomination of each mechanism carries a mutilated gear H, so that the mutilated gears of adjacent denominations are on opposite ends of the dials $D^3$. The two mutilated racks $H^1$ of each mechanism fastened by the cross bars $H^2$ (see Fig. 6) are adapted upon actuation to engage the mutilated gears and reset to zero or clear all the dials, in the well known way. As shown herein, the dials of the adding mechanism are cleared independently of the dials of the accumulating mechanism in order that in performing addition both the sub-totals and grand totals may be determined at one operation, or in order that in multiplication the separate products and the sum thereof may be determined by the same operations. To clear the adding mechanism without clearing the accumulating mechanism, or vice versa, the two mechanisms are first disengaged by disconnecting the clutch members $F^1$. The means shown for this purpose comprise a rotatable plate $H^3$ having shaped slots into which project the pins $H^4$ from the rack bars $H^1$, and the pin $H^5$ from the separating bar $H^6$. (See Fig. 6.) The separating bar is provided with cam shaped lugs $H^7$ adapted to engage the cam shaped lug $H^8$ on the frame $E^{17}$ of the accumulating mechanism. The slots $H^9$ are so shaped that during the first part of the rotation of the handle $H^{19}$ of the plate $H^3$ in either direction from the position shown in Fig. 6, the pin $H^5$ is moved in the direction of travel of the separating bar $H^6$, whereupon the cam lugs $H^7$ and $H^8$ co-act to separate the accumulating mechanism from the adding mechanism, against the action of the springs $H^{12}$ (see Fig. 4), and thereby completely disengage the clutch members $F^1$. Upon further rotation of the plate $H^3$ in an anti-clockwise direction in Fig. 6, the upper pin $H^4$ abuts against the right hand end of its slot $H^{10}$ and moves the rack bars $H^1$ of the adding mechanism to the left, as shown by the broken lines, and thereby resets all the dials of the adding mechanism to zero in the direction of their highest to lowest digits, so that no unit will ever be transferred to a higher denomination during the clearing operation. At the same time the pin $H^4$ in the wide slot $H^{11}$ remains stationary, so that the accumulating mechanism is not cleared. If the plate $H^3$ is turned in a clockwise direction, the two mechanisms are first separated by the co-acting cam lugs $H^7$ and $H^8$ and the dials of the accumulating mechanism alone are reset to zero as a result of moving its racks $H^1$ to the left, as indicated by the broken lines, while those of the adding mechanism are retained in the position to which they were last actuated. It is obvious that if the plate $H^3$ is left in the other extreme position to that shown in Fig. 6, that the two clutch members $F^1$ will be permanently disengaged and that the actuating mechanism of the calculating machine will then be effective on the adding mechanism alone. Generally, however, the adding mechanism or the accumulating mechanism or both will be cleared and then the clutch members $F^1$ reëngaged, by turning the plate $H^3$ in one direction or the other and then returning it to its normal position shown in Fig. 6, or else by operating it in both directions successively and then so returning it. If desired, a spring (not shown) may be used to return the clearing mechanism to normal position after each clearing operation. To release the shafts B when clearing the adding mechanism, the bar $F^6$ carrying the locking dogs $F^4$ is attached at each end by a bell crank $F^7$ and bar $F^8$ to the accumulating mechanism, so that when the accumulating mechanism is separated from the adding mechanism the locking dogs $F^4$ are collectively lifted out of engagement with the clutch members F. (See Fig. 5.)

In constructing adding mechanism of the kind herein disclosed, we have found that the aggregate back lash and lost motion in all the positively engaged elements is sufficient under certain conditions, especially where a plurality of denominations are provided, to cause but a partial transfer of a unit from one denomination to another several places higher. In such case the transfer movement may be gradually merged with the lost motion of the mechanism where the indicators intermediate of the denominations in question previously registered 9. This error may be eliminated by taking up the back lash progressively from the lowest denomination to the highest after each actuation of the machine which may involve a transfer over a plurality of denominations. This idea may be embodied in numerous forms of constructions, but one simple form well adapted for the mechanisms of Figs. 1 to 6 is shown particularly in Figs. 2 and 5. The fingers G are pivoted to the frames $E^{17}$ of the adding and accumulating mechanisms in such position as to rest lightly on the three-tooth part of each gear $E^3$ so as to be capable of lifting to the dotted positions as the gear is turned in the transfer movement. During actuation of the machine, the clutch members F of the carriage are in engagement with the co-acting clutch members of the adding mechanism, and the fingers G and the rectifier bar $G^1$ are in the position shown in Fig. 2. But when the traveling carriage $F^3$ recedes to the position shown in Fig. 5 to disengage the clutch members F, the two rectifier bars $G^1$ for the adding mechanism and the two similar ones for the accumulating mechanism are simultaneously moved longitudinally in the direction of the ascending denominations. Each rectifier bar has cut out portions $G^2$ of progressively increasing length along the bars so arranged that the fingers G of lowest denomination of each mechanism are first pressed downwardly to positively locate the respective six-tooth gears $E^3$. While this one is held down the fingers of next higher denomination are similarly depressed, and so on in turn until all the six-tooth gears have been positively located. In this way all back lash in the elements is progressively taken up from the lowest to the highest denomination of each mechanism, whereupon the position of all the dials will be accurately rectified each time that the traveling carriage $F^3$ recedes from its position of engagement. While the carriage is being returned to its position of engagement, the rectifier bar is returned to the position shown in Fig. 2, whereupon the fingers G will then allow the normal movement of the transfer mechanism. The connection between the traveling carriage and the rectifier bars to produce the longitudinal movement thereof as the carriage engages and disengages the clutch members $F^1$ comprises a bell crank lever $G^3$ fastened at one end to levers for moving the rectifier bars longitudinally and actuated at the other end by the bars $G^4$ fastened to the square shaft $G^5$ along which the traveling carriage slides longitudinally to engage different denominations. It will also be apparent from the above description that when the traveling carriage is in the disengaged position shown in Fig. 5, the fingers G are depressed by the rectifier bar G. Hence when the clearing operation is performed the dials are prevented from overthrow past their zero indications as a result of the fact that the toothed segments $E^2$ carried by the dials are then prevented from further rotation by the six-tooth gears $E^3$ which are then locked by the fingers G. In this way, the rectifier mechanism shown herein not only positively locates the dials after each actuation, but it also insures the clearing operation when such is performed. Furthermore, the dials are held positively in position at other times by the combined action of the locking dogs $F^4$ and the rectifier mechanism.

Figures 5, 6, 8:
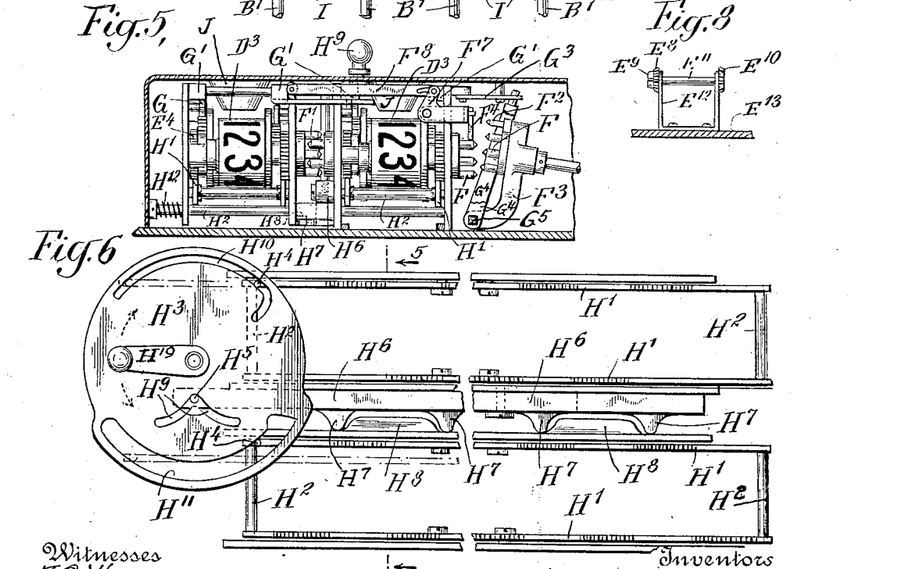
Fig. 5 is a reduced sectional end elevation, on line 5—5 of Fig. 6, of associated adding and accumulating mechanisms similar to Fig. 1, particularly showing the locking mechanism combined with a traveling carriage of calculating machines for multiplication and like processes.
Fig. 6 is an enlarged plan view of clearing means adapted for associated adding and accumulating mechanisms such as shown in Fig. 1.
Fig. 8 is a part of the transfer mechanism of Fig. 7.

The construction and operation of the adding and accumulating mechanisms shown in Figs. 7 and 8 will now be described. The differential gearings of the two mechanisms are identical excepting that the digits of adjacent dials are arranged consecutively in opposite directions, since the direction of rotation of adjacent actuating shafts is opposite instead of being the same as in Figs. 1 to 6. Each shaft $B^1$ has a driving component for each mechanism comprising a collar $B^2$ on which is rotatably mounted the bevel gear $A^1$ of the differential gearing, the shouldered screw $A^2$ loosely holding the gear on the collar and securely fastening the collar to the shaft. The bevel gear $A^1$ of each differential combination is meshed with the transfer receiving component, the bevel gear $C^1$, on one side and with the indicating or transfer actuating component, the bevel gear $D^5$, on the other side. Fastened to each transfer receiving component $C^1$ is a gear $E^5$ having twenty teeth, and fastened to each dial $D^6$ is a cut-out disk $E^6$ and a toothed segment $E^7$ similar to $E^1$ and $E^2$ respectively of Fig. 2. An intermediate transfer gear having a six-tooth part $E^8$ adapted to engage with the segment $E^7$ and a three-tooth part $E^9$ adapted to run on the periphery of the cut-out disk $E^6$, together with the gear $E^{10}$, are fastened on a shaft $E^{11}$ carried by the bracket $E^{12}$ which is fixed to the base $E^{13}$ of the machine, as is shown best in Fig. 8. The shaft $E^{11}$ is set slightly oblique as shown so that the transfer gear $E^5$ of the next higher denomination is properly actuated from the preceding dial. As in the previous constructions, the transfer receiving component $C^1$ of the lowest denomination of each mechanism is fastened to the fixed frame $E^{17}$ of the machine and need not be provided with a transfer gear $E^5$, while the dial of the highest denomination of each mechanism need not be provided with a cut-out disk $E^6$ or a tooth segment $E^7$.

Each shaft $B^1$ is turned by one or more actuating devices such as the gear I fixed or slidably mounted thereon and operated by any suitable mechanism (not shown) such as employed in adding, multiplying or other calculating machines. The transfer receiving component $C^1$ of each denomination of each mechanism is locked by the intermediate transfer gear $E^9$ and the cut-out disk $E^6$ of the next lower denomination. Then since each gear I has twenty teeth, its actuation through one tooth turns the corresponding dial of both the adding and accumulating mechanisms through one-tenth of a rotation or one digit, because each gear $A^1$ of that denomination is both turned around with the shaft $B^1$ as an axis and rolled around on the transfer receiving component $C^1$ about the screw $A^2$ as an axis. As before, when any dial of either mechanism is passing from 9 to 0 in addition or from 0 to 9 in subtraction, the toothed segment $E^7$ fastened thereto advances the twenty tooth transfer gear $E^5$ of the next higher denomination of that mechanism through two teeth in the same direction of rotation by means of the intermediate transfer gears $E^8$ and $E^{10}$. Thus the transfer receiving component $C^1$ of the differential gearing is turned through one-tenth of a rotation, and the corresponding gear $A^1$ is rotated one-tenth of a rotation thereby about its stud $A^2$, thus turning the indicating component $D^5$ through one-tenth of a rotation and the dial $D^6$ through one digit in the same direction of rotation as produced by the shaft $B^1$. In this way, units are transferred to the next higher denominations simultaneously with the direct actuation of the shaft of that denomination, or alone if the shaft is not being actuated. It is apparent that the shafts are not turned as a result of the transfer operation, and hence the transfer operations of two or more mechanisms on the shafts $B^1$ are rendered entirely independent as before.

Figure 7:
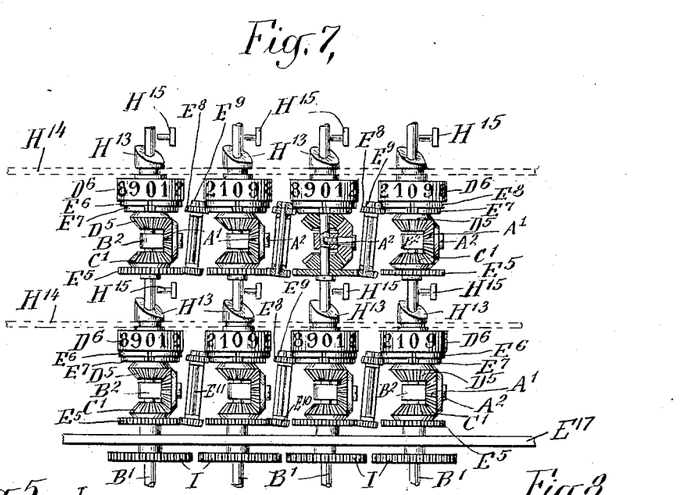
Fig. 7 is another form of associated adding and accumulating mechanisms with another form of clearing means.

Any suitable clearing means may be used but in Fig. 7 a face cam $H^{13}$ is fastened to each dial while the bars $H^{14}$ are adapted to separately disengage the indicating components $D^5$ together with the dials $D^6$ of each mechanism from the respective gears $A^1$ and then force all the cams $H^{13}$ against the stationary pins $H^{15}$ to reset the dials to zero. The indicating components are then returned into engagement with their respective driving components by a spring or in any suitable way. It is necessary in this case that the number of teeth in each of the indicating components $D^5$ be some multiple of the number of digits on the dial, twenty being shown, in order that the elements will properly reëngage after clearing. As a result of this construction wherein the differential gearing is disengaged for clearing, the shafts $B^1$ may be continuous between the two mechanisms, instead of requiring disengageable clutches as before.

Means for locking those shafts not operated at the time, and the rectifier for eliminating the back lash and lost motion and positively locating and holding the dials after each operation may be of any suitable construction. It will be understood that the adding, multiplying or other calculating mechanism to be operatively connected to the shafts $B^1$ must be so constructed that adjacent shafts are always turned in opposite directions in order to make successive operations properly accumulative on each of the two or more mechanisms.

The construction and operation of the modification shown in Figs. 9 to 16 will now be described. In this case the indicators are at right angles to those shown in the examples of construction previously described. The gears $B^3$ are adapted to be actuated by the operating mechanism of any suitable calculating machine and are fastened to the driving component $A^3$ of the differential gearings, as shown separately in Fig. 15. The gear $A^3$ meshes with the indicating or transfer actuating component $D^7$ and is mounted internally of the dial $D^8$ for free rotation about the shaft $D^9$. The dial $D^8$ is loosely mounted on shaft $B^4$ and carries the cut-out disk $E^{14}$ which has two sets of two teeth $E^{15}$ diametrically disposed, so as to actuate the six-tooth cut-out intermediate transfer gear $E^{16}$ twice in each rotation of the dial or once for each series of digits 0 to 9. During the time that a unit is not being transferred to the next higher denomination, the cut-out portion of the gear $E^{16}$ rides on the smooth periphery of the cut-out disk $E^{14}$ to lock the transfer receiving component $E^{21}$ of the next higher denomination, while the transfer receiving component of the lowest denomination is fastened to the frame $E^{17}$ of the machine by the pins $E^{18}$. Each actuation of the six-tooth gear $E^{16}$ turns the gear $E^{19}$ five-teeth, and the fifty tooth gear $E^{20}$ through one-tenth of a rotation. The indicating component is turned thereby through onetwentieth of a rotation and the dial $D^8$ is turned one digit in the same direction of actuation as by the driving component. Upon operation of the adding or multiplying mechanism, the gear $B^3$ is turned through one-tenth of a rotation for each unit, and the gear $D^7$ is rolled on the transfer-receiving component $E^{21}$ to turn the dial $D^8$ through one digit. If a unit is transferred at the same time from the dial of next lower denomination, the transfer receiving component $E^{21}$, loose upon the shaft $B^4$ is turned in the same direction to that of driving component $A^3$ and the indicating component is advanced by an amount equal to the sum of the two superposed movements, or two digits.

Figure 9:
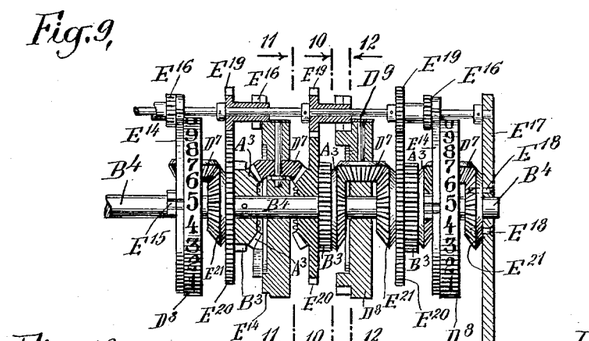
Fig. 9 is another form of adding mechanism.
Figures 10, 11:
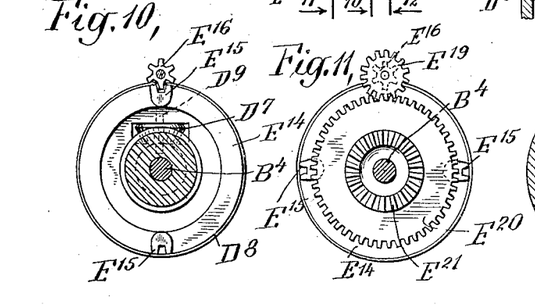
Figs. 10, 11 and 12 are sectional elevations on lines 10—10, 11—11 and 12—12, respectively, of Fig. 9.
Figure 12:
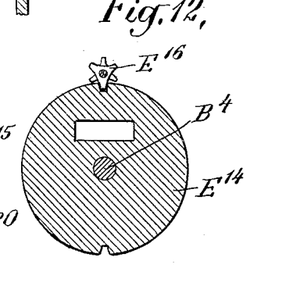
Figure 13:
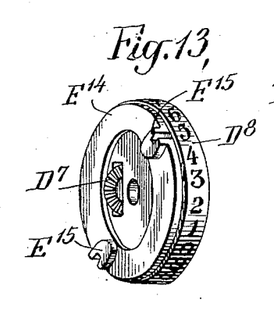
Figs. 13 to 16 show the separate elements of the adding mechanism of Fig. 9.
Figures 14, 15:
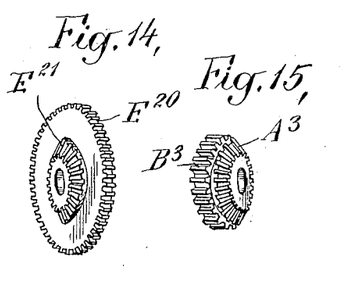

The adding mechanism shown in Fig. 9 may be combined with an accumulating mechanism, as in the preceding arrangement. The locking and clearing mechanism and the rectifier may be constructed in any suitable way.

Figure 17:
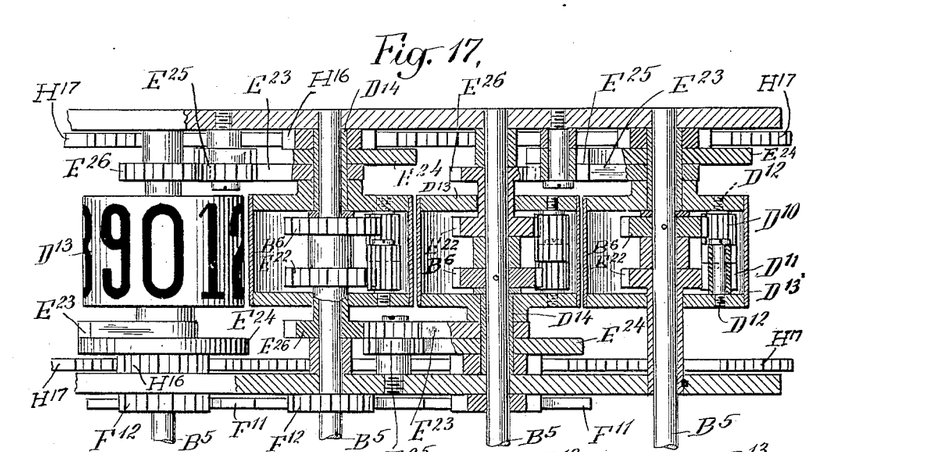
Fig. 17 is a plan view, partly in section, of another form of adding mechanism with another form of locking mechanism.
Figure 18:
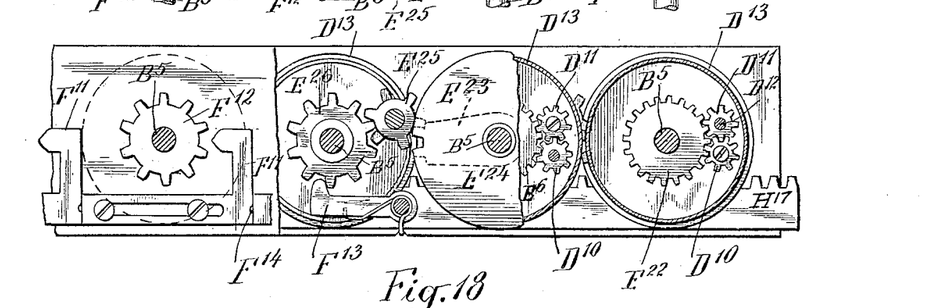
Fig. 18 is a sectional elevation showing other details of the construction embodied in Fig. 17.

Figs. 17 and 18 show another modification within our invention wherein the differential gearings are constructed of spur gears instead of bevel gears as previously described. In this case also the transfer movements may be superposed on the adding movements, while one or more accumulating mechanisms may be combined with the adding mechanism. The dials inclose the differential gearings and the transfer receiving components are alternately disposed at the two ends of the dials. The shafts $B^5$ may be operated from an adding, multiplying or other calculating mechanism in any suitable way. The driving components, the spur gears $B^6$, are fastened to the shafts $B^5$, while the transfer receiving components, the spur gears $E^{22}$, are loosely mounted thereon. The indicating or transfer actuating components comprise the spur gears $D^{10}$ meshing with the driving components $B^6$ and the spur gears $D^{11}$ meshing with the transfer receiving components $E^{22}$, both meshing with each other and being rotatably mounted on pins $D^{12}$ carried by the dials $D^{13}$. The dials are fastened on the sleeves $D^{14}$ which also carry the two-tooth segments $E^{23}$ and the cut-out disks $E^{24}$. The segments $E^{23}$ periodically engage with the six-teeth of the cut-out gears $E^{25}$, while the peripheries of the cut-out disks $E^{24}$ roll in their cut-out portions to lock the transfer elements except during the periods of transfer when the cut-out portions of the disks engage one of the three teeth of the cut-out portions of the six-tooth gears. The six teeth of the gears $E^{25}$ also engage with the ten-tooth transfer gears $E^{26}$ which are fastened to the transfer receiving component $E^{22}$.

When any one shaft $B^5$ is operated, the corresponding driving component $B^6$ is turned through an equal amount and turns the indicating component through one-half that amount, since the transfer receiving component $E^{22}$ is locked from the next lower denomination. So also, when a transfer movement takes place, the six-tooth gear $E^{25}$ and the ten-tooth transfer gear $E^{26}$ are each turned through two teeth, being one-fifth of a rotation of $E^{26}$ which effects one-tenth of a rotation of the dial $D^{13}$ or one digit. When the transfer and actuating movements occur simultaneously, the dial moves through two digits, as in the previous case.

Another arrangement for locking the shafts $B^5$ which are not being actuated at the time is shown in Figs. 17 and 18, but in this case only those of higher denomination than the highest engaged by the traveling carriage (not shown) are adapted to be locked against rotation, inasmuch as units can never be transferred to denominations lower than the lowest engaged thereby. Longitudinally sliding dogs $F^{11}$ abut each other so that when a pin or the like on the traveling carriage at the clutch member F (see Fig. 5) of highest denomination enters the opening $F^{14}$, all those dogs of still higher denomination are moved into locking engagement with the gears $F^{12}$ secured on the shafts $B^5$ to prevent rotation of the shafts by the dials to which a unit is carried. If desired, all the locking dogs may be returned to the position shown in Fig. 18 by a spring, when the carriage recedes to the position shown in Fig. 5. The spring pressed fingers $F^{13}$ engage the teeth of gears $F^{12}$ to hold the shafts $B^5$ in position and to force the exact setting. The dials may be cleared by mutilated gears $H^{16}$ fastened on the sleeves $D^{14}$, and the sliding racks $H^{17}$, or in any other suitable way.

It is apparent that one or more accumulating mechanisms may be combined with this adding mechanism also, and any suitable form of rectifier may be used for the purpose previously described.

What we claim is:

1. In an adding mechanism, a driving shaft, a differential gearing mounted on the shaft, and a cylindrical dial fastened to one component of the gearing and surrounding the gearing; substantially as described.

2. In an adding mechanism, a driving shaft, and a bevel differential gearing comprising three intermeshed bevel gears mounted thereon, and an indicator and a transfer actuator actuated by the gearing; substantially as described.

3. In an adding mechanism, a driving shaft, a bevel differential gearing including one bevel gear fixed to said shaft and another bevel gear loose upon said shaft, a carrier mounted between said bevel gears for free rotation about said shaft, a third bevel gear loosely mounted upon said carrier in mesh with the other two of said bevel gears, and an indicator fastened to said carrier; substantially as described.

4. In an adding mechanism, a driving shaft, a bevel differential gearing including one bevel gear fixed to said shaft and another bevel gear loose upon said shaft, a carrier mounted between said bevel gears for free rotation about said shaft, a third bevel gear loosely mounted upon said carrier in mesh with the other two of said bevel gears, and a cylindrical dial surrounding the said three bevel gears and being fastened to said carrier; substantially as described.

5. In an adding mechanism, a driving shaft, and a differential gearing having one component fixed to said shaft, another component loose upon said shaft and provided with a transfer actuator and an indicator, and a third component loose upon said shaft and provided with a transfer receiver; substantially as described.

6. In an adding mechanism, a driving shaft and an intermeshed differential gearing comprising one bevel gear fixed to said shaft, another bevel gear loose upon said shaft and carrying a transfer receiver, and a third bevel gear mounted upon a carrier which is mounted loosely upon said shaft and which is provided with an indicator; substantially as described.

7. In an adding mechanism, a driving shaft, a differential gearing comprising one bevel gear fixed to said shaft, another bevel gear loose upon said shaft and carrying a transfer receiver, and a third bevel gear in mesh with the other two bevel gears and mounted loosely upon a carrier which is mounted loosely upon said shaft, in combination with a cylindrical dial fastened to said carrier and surrounding the three bevel gears; substantially as described.

8. In an adding mechanism having indicators for different denominations, a differential gearing for each indicator having one component adapted to receive a transfer movement, said gearings being alternately reversed in order that the transfer receiving components may not register in adjacent gearings; substantially as described.

9. In an adding mechanism having indicators for different denominations, like differential gearings for said indicators having one component adapted to receive a transfer movement, said gearings being alternately reversed in order that the transfer receiving components may not register in adjacent gearings; substantially as described.

10. In an adding mechanism, differential gearings for successive denominations, a dial surrounding each of said gearings and actuated by one component thereof, and a transfer actuator mounted with each dial, the transfer actuators being located at one end of one dial and at the other end of the next dial, and so on throughout the mechanism; substantially as described.

11. In an adding mechanism, alternately reversed differential gearings for successive denominations, a dial surrounding each of said gearings and being arranged in line with the other dials, and a transfer actuator mounted with each dial, said transfer actuators being located at one end of one dial and at the other end of the next dial, and so on throughout the mechanism; substantially as described.

12. In an adding mechanism having indicators for different denominations, a plurality of substantially parallel shafts, and a differential gearing mounted upon each shaft having a component adapted to receive a transfer movement and a component adapted to actuate a transfer receiving component of another gearing, the transfer receiving component of each gearing being disposed opposite the transfer actuating component of the gearing of the next lower denomination; substantially as described.

13. In an adding mechanism having indicators for different denominations, a plurality of substantially parallel shafts, and like differential gearings mounted opposite one another upon said shafts, each of said gearings having a component adapted to receive a transfer movement and a component adapted to actuate the transfer receiving component of the gearing of next higher denomination, and said gearings being alternately reversed upon said shafts in order that the transfer actuating component of one gearing may register with the transfer receiving component of next higher denomination; substantially as described.

14. In an adding mechanism comprising a plurality of denominations, a plurality of substantially parallel shafts, like differential gearings mounted opposite one another upon said shafts, and a plurality of indicators, each of said gearings having a component adapted to receive a transfer movement and a component adapted to actuate the indicator of its denomination and also adapted to actuate the transfer receiving component of the gearing of next higher denomination, and said gearings being alternately reversed upon said shafts in order that the transfer actuating component of one gearing may register with the transfer receiving component of next higher denomination; substantially as described.

15. In an adding mechanism comprising a plurality of denominations, a plurality of substantially parallel shafts, like differential gearings mounted opposite one another upon said shafts, and a plurality of indicators, each of said gearings having a component fixed to its shaft, a component loose upon its shaft and adapted to receive a transfer movement, and a component adapted to actuate the indicator of its denomination and also adapted to actuate the transfer receiving component of the gearing of next higher denomination, and said gearings being alternately reversed upon said shafts in order that the transfer actuating component of one gearing may register with the transfer receiving component of the gearing of next higher denomination; substantially as described.

16. In an adding mechanism comprising a plurality of denominations, a plurality of substantially parallel shafts, like intermeshed bevel differential gearings mounted opposite one another upon said shafts, and a plurality of indicators, each of said gearings having a driving component fixed to its shaft, a component loose upon its shaft and adapted to receive a transfer movement, and an intermediate component adapted to actuate the indicator of its denomination and also adapted to actuate the transfer receiving component of the gearing of next higher denomination, and said gearings being alternately reversed upon said shafts in order that the transfer actuating component of one gearing may register with the transfer receiving component of next higher denomination; substantially as described.

17. In an adding mechanism comprising a plurality of denominations, a plurality of substantially parallel shafts, like intermeshed bevel differential gearings mounted opposite one another upon said shafts, and a plurality of cylindrical dials surrounding individual gearings, each of said gearings having a driving component fixed to its shaft, and a transfer actuating component loose upon a carrier which is loosely mounted upon the shaft and which is fastened to the dial of its denomination, and a transfer receiving component loose upon its shaft and adapted to receive a transfer movement from the transfer actuating component of next lower denomination, and said gearings being alternately reversed upon said shafts in order that the transfer receiving component of one gearing may register with the transfer actuating component of next lower denomination; substantially as described.

18. In an adding mechanism having indicators for different denominations, a plurality of substantially parallel shafts, and individual differential gearings mounted thereon in such manner that the driving components of said gearings are arranged to drive the indicators in like directions when the several shafts are moved in one direction; substantially as described.

19. In an adding mechanism having indicators for different denominations, a plurality of substantially parallel shafts, and differential gearings mounted upon said shafts, each of said gearings having a driving component, a transfer receiving component and a transfer actuating component, so arranged that the driving components drive the indicators in like directions when the several shafts are moved in one direction and so that the transfer actuating components actuate the transfer receiving components of next higher denomination in the direction to actuate the indicators in the same direction as they are driven by the shafts; substantially as described.

20. In an adding mechanism, a shaft, disengageable means for actuating said shaft, a differential gearing mounted upon said shaft, and means for locking said shaft against movement when the actuating means is disengaged therefrom; substantially as described.

21. In an adding mechanism, a plurality of differential gearings, a traveling carriage adapted to engage certain ones of said gearings at a time, and means for locking against rotation those differential gearings not engaged at the time by the carriage; substantially as described.

22. In an adding mechanism, a plurality of differential gearings, means for locking said gearings against rotation, a traveling carriage adapted to engage certain ones of said gearings at a time and to unlock those gearings engaged at the time; substantially as described.

23. In an adding mechanism, a plurality of differential gearings of successive denominations, a traveling carriage adapted to engage certain ones of said gearings at a time, and means to lock against rotation those gearings of higher denomination than the highest denomination engaged at the time by said carriage; substantially as described.

24. In an adding mechanism, a plurality of substantially parallel shafts, a differential gearing mounted upon each shaft, means for individually locking each shaft against rotation, a traveling carriage adapted to engage certain ones of said shafts at a time, and means on said carriage for unlocking those shafts engaged thereby; substantially as described.

25. In an adding mechanism, a plurality of differential gearings, individual driving members for said gearings, means for locking said members against retrogression, and means for collectively unlocking said members to permit retrogression; substantially as described.

26. In an adding mechanism, a plurality of differential gearings, individual driving members for said gearings, means for individually locking said members, and means for collectively unlocking said members; substantially as described.

27. In an adding mechanism, a plurality of differential gearings, means for individually locking said gearings against rotation, a traveling carriage adapted to engage certain ones of said gearings at a time and to unlock those gearings engaged at the time, and means for collectively unlocking said gearings; substantially as described.

28. In an adding mechanism, a plurality of indicators of successive denomination, interconnected differential gearings actuating the indicators, and a rectifier acting on the indicators in the order of ascending denomination; substantially as described.

29. In an adding mechanism, a plurality of indicators of successive denomination, interconnected differential gearings actuating the indicators, and a rectifier which first completely rectifies one indicator, then completely rectifies the indicator of next higher denomination, and so on; substantially as described.

30. In an adding mechanism, a plurality of indicators of successive denomination, interconnected differential gearings actuating the indicator, and a rectifier which rectifies the indicators in the order of ascending denomination and holds the rectified indicators against movement; substantially as described.

31. In an adding mechanism, a plurality of indicators of successive denomination, interconnected differential gearings actuating the indicators, and a rectifier which first rectifies one indicator and then holds it against movement, and which next rectifies the indicator of next higher denomination and then holds it against movement, and so on; substantially as described.

32. In an adding mechanism, a plurality of indicators of successive denominations, differential gearings actuating the indicators, transfer mechanism interconnecting adjacent gearings, and a rectifier acting on the transfer mechanism in the order of ascending denomination to rectify the indicators; substantially as described.

33. In an adding mechanism, a plurality of indicators of successive denominations, interconnected reversible differential gearings actuating the indicators in either direction, and a rectifier acting on the indicators in the order of ascending denomination to rectify them from offset positions in either direction; substantially as described.

34. In an adding mechanism, a plurality of indicators of successive denominations, reversible differential gearings actuating the indicators in either direction, reversible transfer mechanism interconnecting adjacent gearings, and a rectifier acting on the transfer mechanism in the order of ascending denomination to rectify the indicators from offset positions in either direction; substantially as described.

35. In an adding mechanism, a plurality of indicators of successive denominations, actuating gearings therefor, transfer mechanism constantly interconnecting adjacent gearings, and a rectifier rectifying the indicators in the order of ascending denomination from whatever position they may have; substantially as described.

36. In an adding mechanism, a plurality of indicators of successive denominations, actuating gearings therefor, transfer mechanism constantly interconnecting adjacent gearings, and a rectifier acting on the transfer mechanism in the order of ascending denomination to rectify the indicators from whatever position they may have; substantially as described.

37. In a calculating machine having an adding mechanism and a traveling carriage adapted to engage certain denominations thereof at a time, a rectifier arranged to rectify the indicators of the adding mechanism upon disengagement of the traveling carriage; substantially as described.

38. In a calculating machine having an adding mechanism and a traveling carriage adapted to engage certain denominations thereof at a time, means actuated by the traveling carriage for resisting the movement of the indicators until reëngagement thereof; substantially as described.

39. In a calculating machine having an adding mechanism and a traveling carriage adapted to engage certain denominations thereof at a time, a rectifier arranged to rectify the indicators of the adding mechanism upon disengagement of the traveling carriage and then to hold the indicators against movement until reëngagement thereof; substantially as described.

40. In a calculating machine having an adding mechanism and a traveling carriage adapted to engage certain denominations thereof at a time, a rectifier for rectifying said indicators upon disengagement of said carriage and for holding them against movement while the traveling carriage is disengaged, and mechanism actuated by the traveling carriage for operating the rectifier; substantially as described.

41. In a calculating machine, an adding mechanism comprising a plurality of interconnected differential gearings of successive denomination and indicators therefor, an accumulating mechanism comprising a plurality of interconnected differential gearings of successive denomination and indicators therefor, disengageable connections between those differential gearings of the two mechanisms which have the same denomination, driving members engaging the differential gearings of a single one of the two mechanisms, and clearing means for clearing the adding mechanism to zero when it is disengaged from the accumulating mechanism; substantially as described.

42. In a calculating machine, an adding mechanism comprising a plurality of interconnected differential gearings of successive denomination and indicators therefor, an accumulating mechanism comprising a plurality of interconnected differential gearings of successive denomination and indicators therefor, disengageable connections between those differential gearings of the two mechanisms which have the same denomination, driving members engaging the differential gearings of a single one of the two mechanisms, a disengaging and clearing member for first disengaging the connections between the two mechanisms and then clearing the adding mechanism to zero without clearing the accumulating mechanism, and a clearing member for clearing the accumulating mechanism to zero; substantially as described.

43. An adding mechanism comprising a plurality of differential gearings each having a driving component fast upon a shaft, a transfer receiving component loose upon said shaft, and an indicating and transfer actuating component actuated by said components, in combination with an accumulating mechanism comprising a driving component fast upon a shaft, a transfer receiving component loose upon said shaft, and an indicating and transfer actuating component actuated by said components, the shafts of like denomination being connected together so that the movement of a shaft moves the indicators of that denomination in both mechanisms through the same amount, while the transfer actuating movements in each mechanism are independent of the other mechanism; substantially as described.

44. In an adding mechanism, a plurality of indicators of successive denominations, separately driven differential gearing for the indicators, intermittent gearings connecting the transfer actuating and receiving components of adjacent gearings, clearing means for resetting the indicators to zero, and means for rendering the intermittent gearings inoperative during the operation of the clearing means to prevent overthrow of the indicators beyond zero; substantially as described.

45. In an adding mechanism comprising a plurality of denominations, differential gearings for the individual denominations, intermittent gearings connecting the transfer actuating component of each of said differential gearings with the transfer receiving components of the differential gearings of next higher denominations, an indicating component in each of the said differential gearings, means for moving said indicating components to zero, and a lock effective to prevent the operation of said transfer receiving components and thereby prevent the overthrow of said indicating components beyond zero; substantially as described.

46. In an adding mechanism comprising a plurality of denominations, differential gearings for the individual denominations, intermittent gearings connecting the transfer actuating component of each of the differential gearings with the transfer receiving component of the differential gearing of next higher denomination, an indicating component in each of the differential gearings, means for moving the indicating components to zero, and a lock acting on the intermittent gearings during the clearing operation to hold the transfer receiving components against movement and thereby prevent the overthrow of the indicating components beyond zero; substantially as described.

47. In an adding mechanism, a plurality of differential gearings and indicators therefor, individual driving members for the gearings, locking devices for locking against retrogression such of said driving members as may be temporarily inoperative, clearing means for clearing said indicators to zero, and means for unlocking all of the driving members prior to the clearing operation; substantially as described.

48. In an adding mechanism, a plurality of differential gearings and indicators therefor, individual driving members for the gearings, locking devices for locking against retrogression such of said driving members as may be temporarily inoperative, clearing means for clearing said indicators to zero, and means for unlocking all of the driving members prior to the clearing operation, and for re-locking the driving members after the clearing operation; substantially as described.

49. In an adding mechanism, a plurality of differential gearings and indicators therefor, individual driving members for the gearings, locking devices for locking against retrogression such of said driving members as may be temporarily inoperative, and means actuated by the clearing means for unlocking all the driving members prior to the clearing operation; substantially as described.

50. In an adding mechanism, a differential gearing for effecting the adding and transfer movements, and means for releasing one component of said gearing in order to reset said mechanism to zero; substantially as described.

51. In an adding mechanism; a differential gearing having a driving component, a transfer receiving component, and an indicating component; and means for releasing the driving component to reset the indicating component to zero; substantially as described.

In testimony whereof we affix our signatures, in presence of two witnesses.

MARCUS C. HOPKINS.
LEON WALTER ROSENTHAL.

Witnesses:
MINERVA LOBEL,
F. A. HENNESSY.